US012679177B2

(12) United States Patent
Lin et al.

(10) Patent No.: US 12,679,177 B2
(45) Date of Patent: Jul. 14, 2026

(54) MODULAR AIR OUTLET ASSEMBLY AND VEHICLE

(71) Applicant: NINGBO FUERDA SMARTECH CO., LTD., Ningbo (CN)

(72) Inventors: Shi Qiang Lin, Ningbo (CN); Li Feng Huang, Ningbo (CN); Lin Li, Ningbo (CN); Hong Jun Chen, Ningbo (CN); Zhe Xu, Ningbo (CN); Zeng Feng Huang, Ningbo (CN)

(73) Assignee: NINGBO FUERDA SMARTECH CO., LTD., Ningbo (CN)

( * ) Notice: Subject to any disclaimer, the term of this patent is extended or adjusted under 35 U.S.C. 154(b) by 413 days.

(21) Appl. No.: 18/546,581

(22) PCT Filed: Mar. 21, 2022

(86) PCT No.: PCT/CN2022/081888
§ 371 (c)(1),
(2) Date: Aug. 15, 2023

(87) PCT Pub. No.: WO2022/199502
PCT Pub. Date: Sep. 29, 2022

(65) Prior Publication Data
US 2024/0042832 A1     Feb. 8, 2024

(30) Foreign Application Priority Data
Mar. 26, 2021     (CN) .......................... 202110324135.3

(51) Int. Cl.
B60H 1/34 (2006.01)
(52) U.S. Cl.
CPC .................................. B60H 1/3421 (2013.01)
(58) Field of Classification Search
CPC .................................................. B60H 1/3421
(Continued)

(56) References Cited

U.S. PATENT DOCUMENTS 7,527,553 B2 * 5/2009 Steinbeiss ............ B60H 1/3442
55/385.3
8,974,273 B2 * 3/2015 Uhlenbusch ......... B60H 1/3442
454/154
(Continued)

FOREIGN PATENT DOCUMENTS

CN          208359879 U       1/2019
CN          110116606 A       8/2019
(Continued)

OTHER PUBLICATIONS

International Search Report dated Jun. 22, 2022 from PCT Application No. PCT/CN2022/081888.

*Primary Examiner* — Avinash A Savani
*Assistant Examiner* — Dana K Tighe
(74) *Attorney, Agent, or Firm* — INNOVATION CAPITAL LAW GROUP, LLP; Vic Lin

(57)          ABSTRACT

A modular air outlet assembly comprises at least two air outlet sub-modules and a housing connecting member, wherein each of the air outlet sub-modules have different functions and are matchingly engaged in a sealed manner, and the air outlet sub-modules comprise a front sub-module and a rear sub-module; the front sub-module comprises a front housing and a front functional component, and the front housing has a standard air inlet joint; the rear sub-module comprises a rear housing and a rear functional component, and the rear housing has a standard air outlet joint and a standard air duct opening joint. A modular approach is used to design the air outlet assembly, and the relative angle between the air outlet sub-modules can be adjusted by means of different housing connecting members to avoid installation limitations in vehicles, and the mold development cost and related costs are reduced.

14 Claims, 3 Drawing Sheets

(58) Field of Classification Search
 USPC .......................................................... 454/155
 See application file for complete search history.

(56) References Cited

U.S. PATENT DOCUMENTS

| | | | | |
|---|---|---|---|---|
| 10,449,836 B2 * | 10/2019 | Lee | ........................ | B60H 1/3442 |
| 2012/0276833 A1 * | 11/2012 | Wittorf | ................ | B60H 1/3421 |
| | | | | 454/155 |
| 2014/0080399 A1 * | 3/2014 | Takai | .................... | B60H 1/3421 |
| | | | | 454/155 |
| 2015/0183300 A1 * | 7/2015 | Kwon | ..................... | B60H 1/246 |
| | | | | 454/155 |
| 2016/0009163 A1 * | 1/2016 | Terai | .................... | B60H 1/3421 |
| | | | | 454/155 |

FOREIGN PATENT DOCUMENTS

| | | | |
|---|---|---|---|
| CN | 111867858 A | 10/2020 | |
| CN | 111923695 A | 11/2020 | |
| CN | 112706589 A | 4/2021 | |
| JP | 2012030718 A | 2/2012 | |
| JP | 2019006167 A | 1/2019 | |

* cited by examiner

MODULAR AIR OUTLET ASSEMBLY AND VEHICLE

This application claims priority to Chinese Patent Application No. 202110324135.3, entitled "Modular Air Outlet Assembly and Vehicle", filed to China National Intellectual Property Administration on Mar. 26, 2021, which is incorporated herein by reference in its entirety.

TECHNICAL FIELD

The invention relates to the field of ventilation equipment for vehicles, in particular to a modular air outlet assembly and a vehicle.

DESCRIPTION OF RELATED ART

Air conditioning outlets, as essential parts of vehicles, are mainly used for conditioning the air environment in vehicles. At present, the air outlets of vehicles on the market are classified as left air outlets, intermediate air outlets, right air outlets, and rear air outlets according to their positions on vehicles. The air outlets on vehicles are not completely identical in structure for many reasons. For example, for the purpose of aesthetics, the left air outlet and the right air outlet are designed symmetrically, which makes the air outlets on a vehicle different in structure. For another example, due to different limitations of the installation spaces at different positions in a vehicle, the air outlets on the vehicle have to be designed to be different in structure. Because the structures of air outlets cannot be unified, a corresponding number of air outlet molds has to be developed during production for different types of air outlets according to design requirements. Actually, molds for air outlets of the same type of vehicles are developed independently, that is, molds for parts, such as blades and dampers, in left, intermediate, right and rear outlet housings are developed independently and are not universal, so the universality is poor. This is so for the same type of vehicles, let along different types of vehicles.

As commonly known, corresponding molds have to be made for producing plastic parts, the size of molds has a direct influence on the cost of the molds, and under the condition that other influence factors remain unchanged, the cost of molds will become higher with the increase of the size of molds. Since the air outlet assembly has a large structure, the corresponding mold cost is high; if the air outlets of vehicles are not universal, molds for the air outlets have to be developed independently, bringing a high mold cost to air outlet manufacturers. How to reduce the mold cost is a problem to be solved by the manufacturers

BRIEF SUMMARY OF THE INVENTION

Technical Problem

How to make an air outlet mold suitable for vehicles of different types and with different space requirements.

Solution to the Problem

Technical Solution

To solve the abovementioned technical problem, the invention provides a modular air outlet assembly, which can reduce the mold development cost and related costs.

The invention provides a modular air outlet assembly, which comprises at least two air outlet sub-modules and a housing connecting member, wherein each of the air outlet sub-module has different functions and is matchingly engaged in a sealed manner, and the air outlet sub-modules comprise a front sub-module and a rear sub-module; the front sub-module comprises a front housing and a front functional component, the front functional component is disposed in the front housing, and the front housing has a standard air inlet joint; the rear sub-module comprises a rear housing and a rear functional component, the rear functional component is disposed in the rear housing, and the rear housing has a standard air outlet joint and a standard air duct opening joint; the standard air outlet joint is matchingly and fixedly engaged with the standard air inlet joint, and the standard air duct opening joint is matchingly and fixedly engaged with an air duct outlet in a vehicle; and the standard air inlet joint and the standard air outlet joint are rotatably connected, and the housing connecting member is used for fixing the standard air inlet joint and the standard air outlet joint and determining a relative angle between the standard air inlet joint and the standard air outlet joint.

Further, the air outlet sub-modules further comprise an intermediate sub-module, the intermediate sub-module comprises an intermediate housing and an intermediate functional component, the intermediate functional component is disposed in the intermediate housing, and the intermediate housing has a standard air inlet joint and a standard air outlet joint.

Further, the front functional component is an outer blade functional component, the intermediate functional component is an inner blade functional component, and the rear functional component is an inner blade functional component or a damper functional component.

Further, the standard air outlet joint is provided two connecting shafts, and the two connecting shafts are disposed on two parallel outer sides of the standard air outlet joint respectively and located on a same axis; the standard air inlet joint is provided with two connecting holes, the two connecting holes are located in two parallel outer sides of the standard air inlet joint respectively, and each of the connecting shafts is correspondingly and matchingly mounted in the corresponding connecting hole; and the standard air outlet joint and the standard air inlet joint are rotatably connected through the connecting shafts and the connecting holes.

Further, the standard air inlet joint has a mounting portion, the standard air outlet joint has a mounting portion, and the two mounting portions are located on an same outer side of a housing; the housing connecting member has at least two fixing portions, and each of the fixing portions is matchingly and fixedly connected with the corresponding mounting portion; and the relative angle between the standard air inlet joint and the standard air outlet joint is determined by a linear distance between two corresponding said fixing portions.

Further, the housing connecting member is a housing connecting plate, and each of the fixing portions is circular through-hole; each of the mounting portions is cylindrical stud; and each of cylindrical studs is fixed in and matched with the corresponding circular through-hole in a clamped manner.

Further, the housing connecting member comprises at least three fixing portions, and marks in a character or pattern form are disposed on a surface of the housing connecting member and are used for distinguishing different distances between the fixing portions.

The invention further provides a modular air outlet assembly, which comprises at least two air outlet sub-modules, a joint change-over housing and a housing connecting member, wherein each of the air outlet sub-modules has different functions and is matchingly engaged in a sealed manner, and the air outlet sub-modules comprise a front sub-module and an intermediate sub-module; the front sub-module comprises a front housing and a front functional component, the front functional component is disposed in the front housing, and the front housing has a standard air inlet joint; the intermediate sub-module comprises an intermediate housing and an intermediate functional component, the intermediate functional component is disposed in the intermediate housing, and the intermediate housing has a standard air outlet joint and a standard air inlet joint; the joint change-over housing has a standard air outlet joint and a standard air duct opening joint; the standard air outlet joints are matchingly and fixedly engaged with the standard air inlet joints, and the standard air duct opening joint is matchingly and fixedly engaged with an air duct outlet in a vehicle; and the standard air inlet joints and the standard air outlet joints are rotatably connected, and the housing connecting member is used for fixing the standard air inlet joints and the standard air outlet joints and determining relative angles between the standard air inlet joints and the standard air outlet joints.

Further, the front functional component is an outer blade functional component, and the intermediate functional component is an inner blade functional component or a damper functional component.

Further, each standard air outlet joint is provided two connecting shafts, and the two connecting shafts are disposed on two parallel outer sides of the standard air outlet joint respectively and located on a same axis; the corresponding standard air inlet joint is provided with two connecting holes, the two connecting holes are located in two parallel outer sides of the standard air inlet joint respectively, and each of the connecting shafts is correspondingly and matchingly mounted in the corresponding connecting hole; and the standard air outlet joints and the standard air inlet joints are rotatably connected through the connecting shafts and the connecting holes.

Further, each standard air inlet joint has a mounting portion, the corresponding standard air outlet joint has a mounting portion, and the two mounting portions are located on an same outer side of a housing; the housing connecting member has at least two fixing portions, and each of the fixing portions is matchingly and fixedly connected with the corresponding mounting portion; and the relative angle between each standard air inlet joint and the corresponding standard air outlet joint is determined by a linear distance between two corresponding fixing portions.

Preferably, the housing connecting member is a housing connecting plate, and each of the fixing portions is circular through-hole; each of the mounting portions is cylindrical stud; and each of cylindrical studs is fixed in and matched with the corresponding circular through-hole in a clamped manner.

Further, the housing connecting member comprises at least three fixing portions, and marks in a character or pattern form are disposed on a surface of the housing connecting member and are used for distinguishing different distances between the fixing portions.

The invention further provides a vehicle, comprising the modular air outlet assembly described above.

Beneficial Effects of the Invention

Beneficial Effects

The invention has the following two beneficial effects:

First, the problems mentioned in the background art are solved, a modular design is adopted for the air outlet assembly for vehicles, and according to design requirements, redesign and mold development are needed only for the visible front sub-module which has requirements for appearance and shape and existing modules can be directly used as other modules, such that the mold development cost and related costs can be reduced.

Second, the housing connecting member is used for fixing the standard air inlet joint and the standard air outlet joint and determining the relative angle between the standard air inlet joint and the standard air outlet joint, the relative angle between the air outlet sub-modules can be adjusted, and under the condition where the vertical angle and horizontal angle between left, intermediate and right air outlets and an air duct are required to be different, the relative angle between the air outlet sub-modules can be changed by using different housing connecting members to avoid installation limitations in vehicles, design of parts such as housings is avoided, and the mold development cost and related costs are reduced.

BRIEF DESCRIPTION OF THE SEVERAL
VIEWS OF THE DRAWINGS

PREFERRED EMBODIMENTS FOR
IMPLEMENTING THE INVENTION

Preferred Embodiments of the Invention

The invention is further described below in conjunction with accompanying drawings and specific embodiments.

Figure 1:
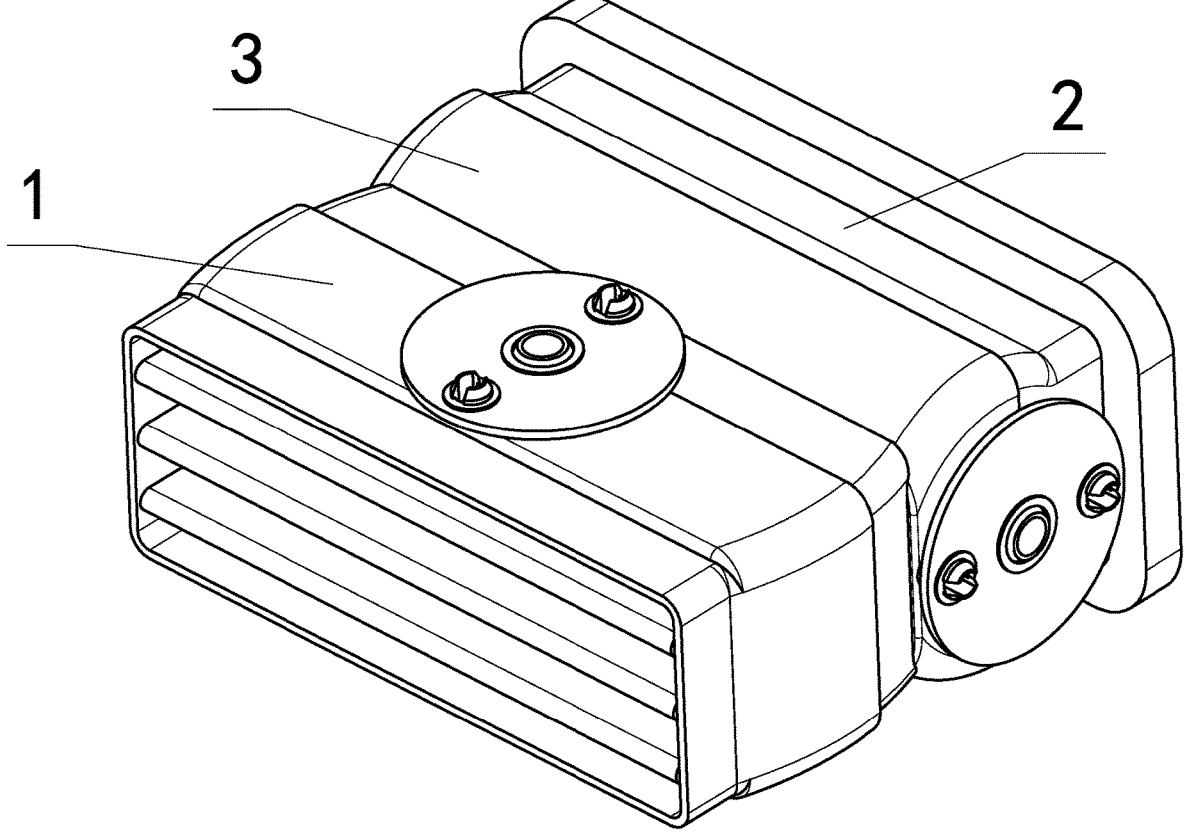
FIG. 1 is a perspective view of a modular air outlet assembly according to Embodiment 1.
Figure 2:
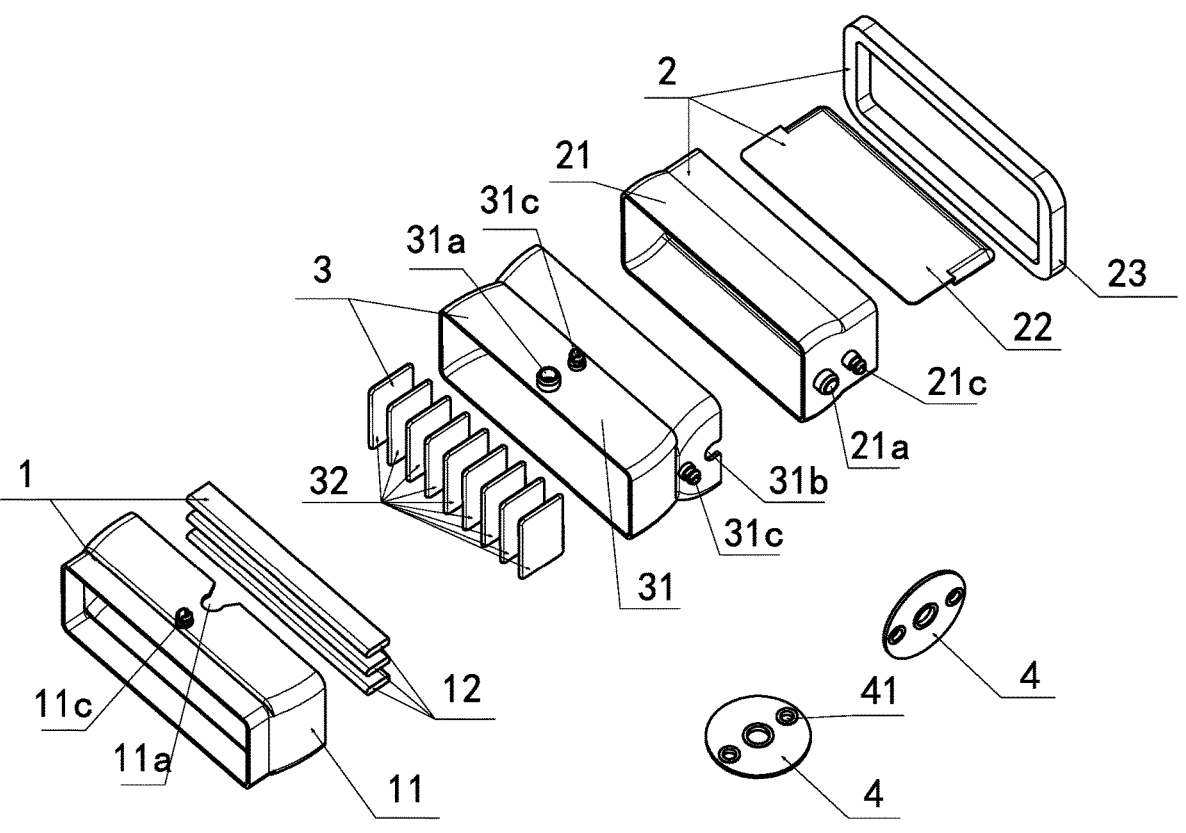
FIG. 2 is an exploded view of the modular air outlet assembly according to Embodiment 1.
Figure 3:
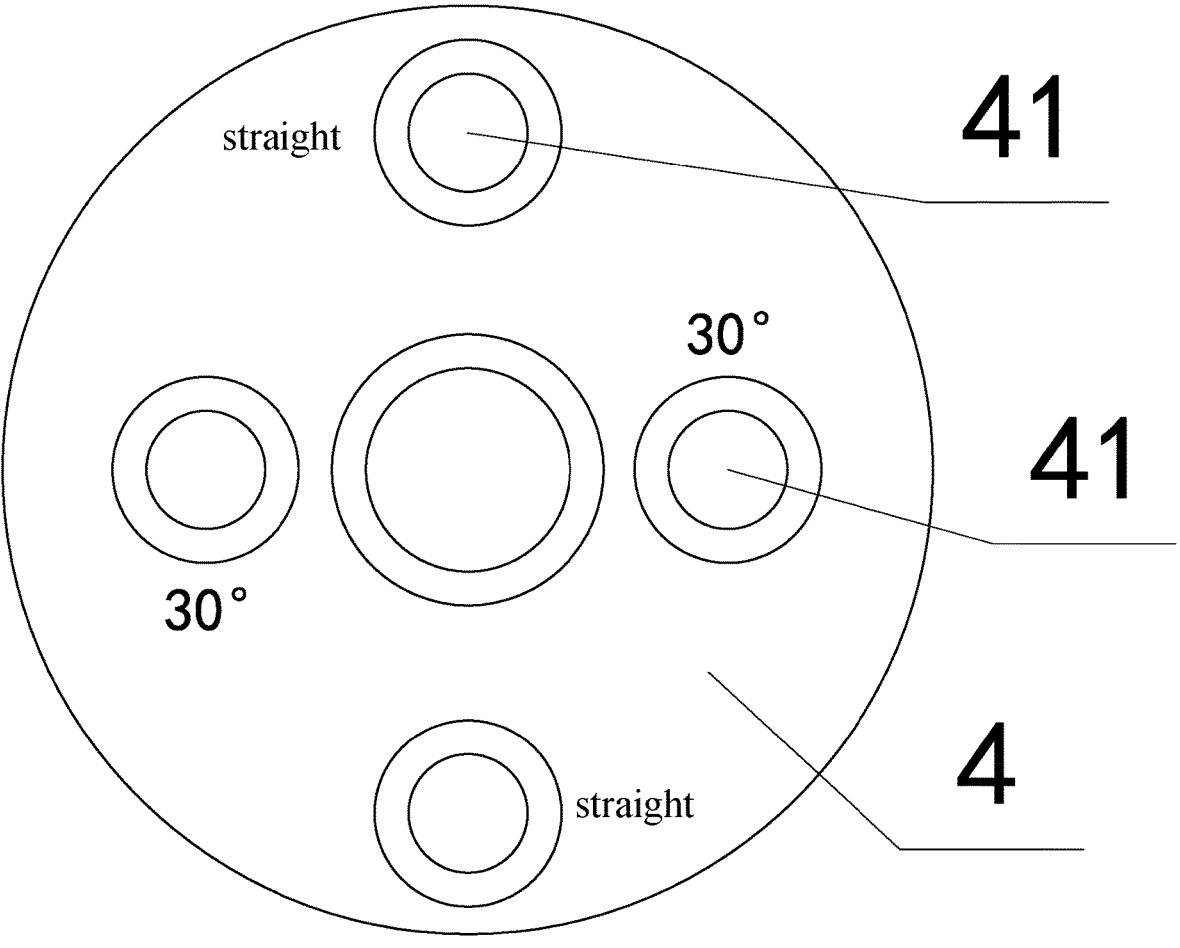
FIG. 3 is a structural view of a housing connecting member according to Embodiment 1.

Embodiment 1: Referring to FIG. 1-FIG. 3, a Modular Air Outlet Assembly comprises three air outlet sub-modules and a housing connecting member, wherein the three air outlet sub-modules have different functions and are matchingly engaged in a sealed manner, and in this embodiment, the housing connecting member is housing connecting plate 4; the air outlet sub-modules comprise a front sub-module, an intermediate sub-module and a rear sub-module, which correspond to an outer blade module 1, an inner blade module 3 and a damper module 2 respectively in this embodiment; wherein, the outer blade module 1 comprises a front housing 11 and an outer blade functional component 12, the outer blade functional component 12 is disposed in the front housing 11, and the front housing 11 has a first standard air inlet joint; the inner blade module 3 comprises an intermediate housing 31 and an inner blade functional component 32, the inner blade functional component 32 is disposed in the intermediate housing 31, and the intermediate housing 31 has a second standard air inlet joint and a first standard air outlet joint; the damper module 2 comprises a rear housing 21, a damper functional component 22 and a sealing strip 23, the damper functional component 22 is disposed in the rear housing 21, and the rear housing 21 has a second standard air outlet joint and a standard air duct opening joint;

The first standard air outlet joint is matchingly and fixedly engaged with the first standard air inlet joint. Specifically, the first standard air outlet joint is provided with two first connecting shafts 31*a*, and the two first connecting shafts 31*a* are disposed at middle positions of two parallel outer sides, namely upper and lower outer sides, of the first standard air outlet joint respectively and located on a same axis; the first standard air inlet joint is provided with two first connecting holes 11*a*, the two first connecting holes 11*a* are located in middle positions of two parallel outer sides, namely upper and lower outer sides, of the first standard air inlet joint respectively, and each of the first connecting shafts 31*a* are correspondingly and matchingly mounted in the each of first connecting holes 11*a*; through the first connecting shafts 31*a* and the first connecting holes 11*a*, the first standard air outlet joint and the first standard air inlet joint are rotatably connected, and a relative angle between the first standard air outlet joint and the first standard air inlet joint can be adjusted with the first connecting shafts 31*a* as an axes, such that the first standard air outlet joint and the first standard air inlet joint are fixed by the housing connecting plate 4, and the angle between the first standard air outlet joint and the first standard air inlet joint is determined by the housing connecting plate 4;

Similarly, the second standard air outlet joint is matchingly and fixedly engaged with the second standard air inlet joint. Specifically, the second standard air outlet joint is provided with two second connecting shafts 21*a*, the two second connecting shafts 21*a* are disposed at middle positions of two parallel outer sides, namely left and right outer sides, of the second standard air outlet joint and located on a same axis; the second standard air inlet joint is provided with two second connecting holes 31*b*, the two second connecting holes 31*b* are located in middle positions of two parallel outer side, namely left and right outer sides, of the second standard air inlet joint, and each of the second connecting shafts 21*a* are correspondingly and matchingly mounted in the corresponding second connecting holes 31*b*; through the second connecting shafts 21*a* correspondingly and matchingly mounted in the second connecting holes 31*b*, the second standard air outlet joint and the second standard air inlet joint are rotatably connected, and the angle between the second standard air outlet joint and the second standard air inlet joint can be adjusted with the second connecting shafts 21*a* as an axes, such that the second standard air outlet joint and the second standard air inlet joint are fixed by the housing connecting plate 4, and the angle between the second standard air outlet joint and the second standard air inlet joint is determined by the housing connecting plate 4; the standard air duct opening joint is matchingly and fixed engaged with an air duct outlet in a vehicle, and the sealing strip 23 is used for sealing a seam between the standard air duct opening joint and the air duct outlet in the vehicle;

A front mounting portion 11*c* is disposed on one outer side of the first standard air inlet joint, the front mounting portion 11*c* is close to the first connecting holes 11*a*, an intermediate mounting portion 31*c* is disposed on one outer side of the first standard air outlet joint, and the intermediate mounting portion 31*c* is close to the first connecting shafts 31*a*; an intermediate mounting portion 31*c* is disposed on one outer side of the second air inlet joint, the intermediate mounting portion 31*c* is close to the second connecting holes 31*b*, and a rear mounting portion 21*c* is disposed on one outer side of the second air outlet joint, and the rear mounting portion 21*c* is close to the second connecting shafts 21*a*; and the housing connecting plate 4 has two fixing portions 41, and each of the fixing portions 41 is matchingly and fixedly connected with the mounting portions on the air outlet sub-modules, such that the air outlet sub-modules are fixed through the housing connecting plate 4.

It should be noted that the relative angle between the air outlet sub-modules is determined by the linear distance between the two fixing portions 41 correspondingly mounted on the housing connecting plate 4, that is, the change of the linear distance between the two fixing portions 41 will lead to a change of the relative angle between the air outlet sub-modules. The housing connecting plate 4 is used for fixing the air outlet sub-modules and determining the angle between the air outlet sub-modules for the purpose of avoiding installation limitations in some types of vehicles; due to the fact that the installation position of the air outlet assembly may be interfered by other parts in the vehicle or the air outlet assembly may be installed at different positions, the outline structure of the air outlet assembly is limited to some extent, that is, the air outlet assembly cannot be designed to be square, and a receding structure needs to be designed at a corresponding position.

In this embodiment, the fixing portions 41 of the housing connecting plate 4 are circular through-holes, and the mounting portions of the standard air inlet joints and the standard air outlet joints, namely the front mounting portion 11*c*, the intermediate mounting portions 31*c* and the rear mounting portion 21*c*, are all cylindrical studs; and the cylindrical studs are fixed in and matched with the corresponding circular through-holes in a clamped manner. In this embodiment, the housing connecting plate 4 is connected with the standard air inlet joints and the standard air outlet joints in a clamped and fixed manner, which makes assembly and disassembly more convenient. Obviously, this connection manner is not unique, and the housing connecting plate 4 may be connected with the standard air inlet joints and the standard air outlet joints fixedly, for example, through screws, securing glue or ultrasonic welding.

In this embodiment, the relative angle between the air outlet sub-modules is determined by the linear distance between the two corresponding fixing portions, so in order to change the relative angle between the air outlet sub-modules, different housing connecting plates 4 have to be used, more particularly, the linear distance between the fixing portions on the housing connecting plate 4 should be different. The use of more types of housing connecting plates 4 will increase the mold development cost and inventory. To overcome this defect, the housing connecting plate 4 may have three or more fixing portions, and marks in a character or pattern form are disposed on the surface of the housing connecting plate 4 to distinguish different distances between different fixing portions. In a preferred embodiment, as shown in FIG. 3, the housing connecting plate 4 has four fixing portions, marks "straight" and "30°" are disposed on the housing connecting plate 4, and the marks are character marks injection-molded together with the housing connecting plate 4. In this way, the relative angle between the standard air inlet joint and the standard air outlet joint can be changed through the housing connecting plate 4, and the marks in the character or pattern form ensure that the standard air inlet joint and the standard air outlet joint are installed with a correct angle formed therebetween.

The modular air outlet assembly in this embodiment is easy to use and install. First, sub-modules satisfying the demands or requirements of users are selected from outer blade modules 1, inner blade modules 3 and damper modules 2 in different shapes according to the demands or requirements of users. Generally speaking, the inner blade module 3 and the damper module 2 are installed inside a vehicle and are invisible, so the universality of the modules is higher, the number of types of the modules is small, and existing standard modules can be used; the outer blade module 1 is visible and is generally applied to specific vehicles, so a mold needs to be additionally developed for the outer blade module. After the sub-modules are selected, the outer blade functional component 12, the inner blade functional component 32 and the damper functional component 22 are installed on the outer blade module 1, the inner blade module 3 and the damper module 2 respectively, then the outer blade module 1, the inner blade module 3 and the damper module 2 are assembled together, and the angle between the sub-modules is determined through the housing connecting plate 4, such the modular air outlet assembly is obtained.

In this embodiment, a modular approach is used to design the air outlet assembly for vehicles, the air outlet sub-modules can be selected according to functional requirements, the housing connecting plate 4 is used for fixing the air outlet sub-modules and adjusting the relative angle between the air outlet sub-modules, and the housing connecting plate 4 is easy to install and detach; and under the condition where the vertical angle and horizontal angle between left, intermediate and right air outlets and an air duct are different as required by users, the air outlet sub-modules can be changed to satisfy design requirements or avoid installation limitations, the mold development cost and related costs can be reduced greatly, and the research and development progress can be accelerated.

EMBODIMENTS

Embodiments of the Invention

Embodiment 2: A modular air outlet assembly comprises two air outlet sub-modules, a housing connecting plate and a joint change-over housing, wherein the two air outlet sub-modules have different functions and are matchingly engaged in a sealed manner, and the air outlet sub-modules comprise a front sub-module and an intermediate sub-module, which correspond to an outer blade module and an inner blade module respectively in this embodiment; wherein, the outer blade module comprises a front housing and an outer blade functional component, the outer blade functional component is disposed in the front housing, and the front housing has a standard air inlet joint; the inner blade module comprises an intermediate housing and an inner blade functional component, the inner blade functional component is disposed in the intermediate housing, and the intermediate housing has a standard air inlet joint and a standard air outlet joint; the joint change-over housing has a standard air outlet joint and a standard air duct opening joint; the standard air duct opening joint is matchingly and fixedly engaged with an air duct outlet in a vehicle, the standard air inlet joints are matchingly and fixedly engaged with the standard air outlet joints, and the housing connecting plate is used for fixing the standard air inlet joints and the standard air outlet joints and determining the angle between the standard air inlet joints and the standard air outlet joints.

In this embodiment, the joint change-over housing is used to replace the damper module in Embodiment 1. The embodiment is identical with Embodiment in installation and operating principle, and corresponding technical effects of this embodiment can be known with reference to Embodiment 1.

The main difference between this embodiment and Embodiment 1 is their application scenarios. Embodiment 1 is suitable for an application scenario where a damper module is needed to control the air volume and open or close air, while this embodiment is suitable for an application scenario where continuous air ventilation is needed, so in this embodiment, the joint change-over housing replaces the damper module to be matchingly engaged with the inner blade module.

Embodiment 3: A modular air outlet assembly comprises two air outlet sub-modules and a housing connecting plate, wherein the two air outlet sub-modules have different function and are matchingly engaged in a sealed manner, the air outlet sub-modules comprise a front sub-module and a rear sub-module, which correspond to an outer blade module and an inner blade module respectively in this embodiment; wherein, the outer blade module comprises a front housing and an outer blade functional component, the outer blade functional component is disposed in the front housing, and the front housing has a standard air inlet joint; the inner blade module comprises a rear housing and an inner blade functional component, the inner blade functional component is disposed in the rear housing, and the rear housing has a standard air duct opening joint and a standard air outlet joint; the standard air duct opening joint is matchingly and fixedly engaged with an air duct outlet in a vehicle, and the standard air inlet joint is matchingly and fixedly engaged with the standard air outlet joint, and the housing connecting plate is used for fixing the standard air inlet joint and the standard air outlet joint and determining the angle between the standard air inlet joint and the standard air outlet joint.

This embodiment is similar to Embodiment 2, the rear sub-module in this embodiment is equivalent to the combination of the intermediate sub-module and the joint change-over housing in Embodiment 2, a rear functional component in the rear sub-module in this embodiment is the inner blade functional component, and an intermediate functional component in the intermediate sub-module in Embodiment 2 is the inner blade functional component.

Although the invention is described with reference to the preferred embodiments, those ordinarily skilled in the art should understand that the invention is not limited to the above embodiments, and various modifications can be made in form and in detail within the scope of the claims.

What is claimed is:

1. A modular air outlet assembly, comprising at least two air outlet sub-modules and a housing connecting member, wherein each of the air outlet sub-modules has different functions and is matchingly engaged in a sealed manner, and the at least two air outlet sub-modules comprise a front sub-module and a rear sub-module;

the front sub-module comprises a front housing and a front functional component, the front functional component is disposed in the front housing, and the front housing has a standard air inlet joint;

the rear sub-module comprises a rear housing and a rear functional component, the rear functional component is disposed in the rear housing, and the rear housing has a standard air outlet joint and a standard air duct opening joint;

the standard air outlet joint is matchingly and fixedly engaged with the standard air inlet joint, and the standard air duct opening joint is matchingly and fixedly engaged with an air duct outlet in a vehicle;

the standard air inlet joint and the standard air outlet joint are rotatably connected, and the housing connecting member is used for fixing the standard air inlet joint and the standard air outlet joint and determining a relative angle between the standard air inlet joint and the standard air outlet joint.

2. The modular air outlet assembly according to claim 1, wherein the at least two air outlet sub-modules further comprise an intermediate sub-module, the intermediate sub-module comprises an intermediate housing and an intermediate functional component, the intermediate functional component is disposed in the intermediate housing, and the intermediate housing has a standard air inlet joint and a standard air outlet joint.

3. The modular air outlet assembly according to claim 2, wherein the front functional component is an outer blade functional component, the intermediate functional component is an inner blade functional component, and the rear functional component is an inner blade functional component or a damper functional component.

4. The modular air outlet assembly according to claim 1, wherein the standard air outlet joint is provided two connecting shafts, and the two connecting shafts are disposed on two parallel outer sides of the standard air outlet joint respectively and located on a same axis; the standard air inlet joint is provided with two connecting holes, the two connecting holes are located in two parallel outer sides of the standard air inlet joint respectively, and each of the connecting shafts is correspondingly and matchingly mounted in the corresponding connecting hole; and the standard air outlet joint and the standard air inlet joint are rotatably connected through the connecting shafts and the connecting holes.

5. The modular air outlet assembly according to claim 1, wherein the standard air inlet joint has a mounting portion, the standard air outlet joint has a mounting portion, and the two mounting portions are located on an same outer side of a housing; the housing connecting member has at least two fixing portions, and each of the fixing portions is matchingly and fixedly connected with the corresponding mounting portion; and the relative angle between the standard air inlet joint and the standard air outlet joint is determined by a linear distance between two corresponding said fixing portions.

6. The modular air outlet assembly according to claim 5, wherein the housing connecting member is a housing connecting plate, and each of the fixing portions is circular through-hole; each of the mounting portions is cylindrical stud; and each of cylindrical studs is fixed in and matched with the corresponding circular through-hole in a clamped manner.

7. The modular air outlet assembly according to claim 5, wherein the housing connecting member comprises at least three fixing portions, and marks in a character or pattern form are disposed on a surface of the housing connecting member and are used for distinguishing different distances between the fixing portions.

8. A modular air outlet assembly, comprising at least two air outlet sub-modules, a joint change-over housing and a housing connecting member, wherein each of the air outlet sub-modules has different functions and is matchingly engaged in a sealed manner, and the at least two air outlet sub-modules comprise a front sub-module and an intermediate sub-module;

the front sub-module comprises a front housing and a front functional component, the front functional component is disposed in the front housing, and the front housing has a standard air inlet joint;

the intermediate sub-module comprises an intermediate housing and an intermediate functional component, the intermediate functional component is disposed in the intermediate housing, and the intermediate housing has a standard air outlet joint and a standard air inlet joint;

the joint change-over housing has a standard air outlet joint and a standard air duct opening joint;

the standard air outlet joints are matchingly and fixedly engaged with the standard air inlet joints, and the standard air duct opening joint is matchingly and fixedly engaged with an air duct outlet in a vehicle;

the standard air inlet joints and the standard air outlet joints are rotatably connected, and the housing connecting member is used for fixing the standard air inlet joints and the standard air outlet joints and determining relative angles between the standard air inlet joints and the standard air outlet joints.

9. The modular air outlet assembly according to claim 8, wherein the front functional component is an outer blade functional component, and the intermediate functional component is an inner blade functional component or a damper functional component.

10. The modular air outlet assembly according to claim 8, wherein each said standard air outlet joint is provided two connecting shafts, and the two connecting shafts are disposed on two parallel outer sides of the standard air outlet joint respectively and located on a same axis; the corresponding standard air inlet joint is provided with two connecting holes, the two connecting holes are located in two parallel outer sides of the standard air inlet joint respectively, and each of the connecting shafts is correspondingly and matchingly mounted in the corresponding connecting hole; and the standard air outlet joints and the standard air inlet joints are rotatably connected through the connecting shafts and the connecting holes.

11. The modular air outlet assembly according to claim 8, wherein the standard air inlet joint of the front housing has a mounting portion, the corresponding standard air outlet joint has a mounting portion, and the two mounting portions are located on an same outer side of a housing; the housing connecting member has at least two fixing portions, and each of the fixing portions is matchingly and fixedly connected with the corresponding mounting portion; and the relative angle between each said standard air inlet joint and the corresponding standard air outlet joint is determined by a linear distance between two corresponding said fixing portions.

12. The modular air outlet assembly according to claim 11, wherein the housing connecting member is a housing connecting plate, and each of the fixing portions is circular through-hole; each of the mounting portions is cylindrical stud; and each of cylindrical studs is fixed in and matched with the corresponding circular through-hole in a clamped manner.

13. The modular air outlet assembly according to claim 11, wherein the housing connecting member comprises at least three fixing portions, and marks in a character or pattern form are disposed on a surface of the housing connecting member and are used for distinguishing different distances between the fixing portions.

14. A vehicle, comprising the modular air outlet assembly according to claim 1.

* * * * *